Patented Mar. 29, 1938

2,112,764

UNITED STATES PATENT OFFICE 2,112,764

INSOLUBLE AZO COMPOUNDS

Miles A. Dahlen, Frithjof Zwilgmeyer, Newell M. Bigelow, and Robert F. Deese, Jr., Wilmington, Del., assignors to E. I. du Pont de Nemours & Company, Wilmington, Del., a corporation of Delaware No Drawing. Application September 20, 1934, Serial No. 744,786

23 Claims. (Cl. 8—5)

This invention relates to azo dyes, to a method of making azo dyes, to a process of dyeing a material with an azo dye, and to a material dyed with an azo dye.

The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound is called the coupling component. In coupling the components, the azo component is diazotized in a manner which will be understood by persons skilled in the art, and is reacted with the second component, often in solution. Generally speaking, the aryl nuclei of the azo dyes contain certain substituents which change, but do not originate, the color of the dyestuffs and are called "auxochromes". The auxochromes form a recognized class, divided into two groups, of which the one tends to make the dyestuff water-soluble, and the other does not. In this invention those auxochrome groups which tend to make the dyestuff water-soluble are called s-auxochromes and those which do not are called n-auxochromes.

The prior art azo dyes are applied to fabrics, or to other materials to be dyed, in three general ways: (a) The dyestuff is dissolved or dispersed in a suitable bath and the material is dipped in the bath. To be used in this manner the completed dyestuff must be substantive to the material which is to be dyed. (b) A substantive coupling component is directly affixed to the fabric, which is then treated with the diazotized component, completing the dye on the material. (c) A substantive azo component is directly affixed to the fabric which, treated with the coupling component, completes the dye on the material.

The term substantive means that the dye or the particular component has substantial affinity for the material from aqueous solution or suspension. So far as we are aware no instances are recorded of a material having been dyed with an azo color of which none of the azo, nor the coupling component, nor the complete color were substantive.

It is an object of this invention to dye a material with an azo dye of which neither the azo component, the coupling component, nor the completed dye is substantive. Another object of the invention is to produce a material dyed with a dyestuff of which neither the azo component, the coupling component, nor the finished dyestuff is substantive. Another object of the invention is to produce superior yellow dyestuffs. It is also an object of this invention to produce azo colors useful as pigments. Other objects of the invention will be in part apparent and in part hereinafter set forth.

The objects of the invention are accomplished, generally speaking, by impregnating the material to be dyed with a non-substantive azo component and a non-substantive coupling component stabilized against reaction with each other, and by reacting them with each other on the fabric. The objects of the invention are also accomplished by the production of a material dyed with this group of dyestuffs. The objects of the invention are accomplished, more specifically speaking, by impregnating a fabric, or material to be dyed, with a paste containing a non-substantive, n-auxochrome-substituted, diazotized arylamine stabilized by conversion to a water soluble diazo amino derivative, and a non-substantive aceto-acetyl-arylide which may be n-auxochrome substituted, and by exposing the impregnated material at elevated temperature to the action of a weak acid.

In the practice of our invention, as a first component we may use any non-substantive, n-auxochrome-substituted, diazotized aniline. It is also possible to use unsubstituted diazotized aniline as the first component, but the dyestuffs produced by the use of an n-auxochrome-substituted, diazotized aniline are superior to the extent that they constitute an invention in themselves. Exemplary of the very large number of compounds which can be used, when diazotized, as the azo component are the following: 2-methoxy-naphthylamine; 2-methoxy-aniline; 2-phenoxy-aniline; 2-ethoxy-aniline; 2-chlor-5-methyl-aniline; 2-methyl-aniline; 2-methoxy-5-methyl-aniline; 2-methoxy-4-chlor - 5 - methyl-aniline; 2:5-dimethoxy-aniline; 2:5 - diethoxy-aniline; 2:5-dimethoxy-4-chlor-aniline; 5-brom-2-methoxy-aniline; 3-iodo-6-methoxy-aniline; 3-iodo-6-ethoxy-aniline; 3-methyl-4-chlor-aniline; 3-brom-6-ethoxy-aniline; 3-chlor-6-ethoxy-aniline; 3-ethoxy - aniline; 3-phenoxy - aniline; 3-methoxy-aniline; 3-brom-6-phenoxy-aniline; 3-iodo- 6 -phenoxy-aniline; 3-brom-6-methyl-aniline; 3-chlor-6-methyl-aniline; 3-methyl-aniline; 3-brom-5-methyl-aniline; 3-chlor - 6 - phenoxy-aniline; 2:5-dimethyl-4-chlor-aniline; 4-ethyl-aniline; 4 - benzo - trifluor - aniline; 4 - chlor-2-methoxy-aniline; 4-brom-2-methoxy-aniline; 4-brom-2-ethoxy-aniline; 4 - iodo-2-methoxy-aniline; 4-methoxy - aniline; 4-chlor-2-ethoxy-aniline; 4-phenoxy - aniline; 4-ethoxy - aniline; 4-brom-2-phenoxy - aniline; 4 - methoxy-2-chlor-aniline; 4-chlor-2-methyl - aniline; 4-methyl-3-brom - aniline; 4 - brom - 3 - methyl - aniline; 4-methyl - 3 - chlor - aniline; 4-methyl - aniline; 4-chlor-2:5-dimethyl - aniline; 4-chlor-2-phenoxy-aniline; 4-methoxy-3-chlor - aniline; 4-phenoxy-2-chlor-aniline; 4-chlor-2:5-diethoxy-aniline; 3-ethoxy - aniline; 3-methoxy - aniline; 3 - methyl-aniline; 3 - chlor - 2 - methyl-aniline; 3-chlor-2-methoxy-aniline; 2-ethoxy - aniline; 2-methoxyaniline; 2-methyl-aniline; alpha-naphthylamine; beta-naphthylamine.

In the practice of the preferred form of the invention the azo component, diazotized, is coupled with a stabilizing agent. For instance, it is joined by the azo group to the nitrogen group of piperidine carboxylic acid. After stabilization this component can be mixed with the coupling component without reaction provided the mixture is alkaline. The presence of an acid medium would break up the stabilized azo component, which would immediately react with the coupling component to form the complete color.

A great variety of compounds may be used as the coupling component. This coupling component, broadly speaking, is an aceto-acetyl arylide having an aryl nucleus that may or may not have an n-auxochrome substituent. Although several instances are given hereinafter in which there are no substituents in the second aryl nucleus, the presence of substituents is frequently desirable. Among the coupling components whose use has been found satisfactory are the aceto-acetyl derivatives of the following: 2-brom-4-methyl-aniline; 2-chlor-4-ethyl-aniline; 2-chlor-4-phenoxy-aniline; 2-chlor - 4 - ethoxy-aniline; 2 - ethoxy-aniline; 2 - methoxy-1-naphthylamine; 2-methyl-aniline; 2-methoxy - 4 - chlor-5-methyl-aniline; 2-ethoxy-4-chlor-aniline; 2-methoxy-5-brom-aniline; 2-methoxy-aniline; 2-phenoxy-aniline; 2-methoxy-5-methyl-aniline; 2-methoxy-4-chlor-aniline; 2-methyl-4-chlor-aniline; 2 - methyl - 5 - chlor-aniline; 2-methyl-3-chlor-aniline; 2-methoxy-5-chlor-aniline; 2-ethoxy-5-chlor-aniline; 2-methyl - 5 - brom-aniline; 2 - methoxy - 4 - brom-aniline; 2-methoxy-3-methyl-5-chlor-aniline; 2-methoxy-4-methyl-5-chlor-aniline; 2-chlor-aniline; 2:5-dichlor-4-methyl-aniline; 2:5 - dichlor-aniline; 2:5-dimethoxy-aniline; 2:5-dimethoxy-4-chlor-aniline; 2:5-dimethyl-aniline; 2:4-dimethyl-aniline; 2:5-diethoxy-aniline; 2:5-dimethyl - 4 - chlor-aniline; 3 - chlor - 4 - methyl-aniline; 3-brom-4-methoxy-aniline; 3-brom-4 - ethyl-aniline; 3-brom-4-benzyloxy-aniline; 3-chlor - 4 - methoxy - aniline; 3 - brom - 4 - methyl - aniline; 3-methoxy-1-naphthylamine; 3 - brom-1-naphthylamine; 3-chlor-6-methoxy-aniline; 3-chlor-6-phenoxy-aniline; 3-methoxy-aniline; 3-chlor-aniline; 3-brom-6-methyl-aniline; 3-ethoxy-aniline; 3-methoxy-4-chlor-aniline; 3-methoxy-4-brom-aniline; 3-ethoxy-4-chlor-aniline; 3-methoxy-5-chlor-aniline; 3-methoxy-5-brom-aniline; 3-methoxy-4-methyl-6-chlor-aniline; 3-phenoxy-aniline; 3-cyclohexyl-aniline; 3-benzyloxy-aniline; 3:5-dimethoxy-aniline; 3:5-dimethoxy-4-chlor-aniline; 3:5-diethoxy-aniline; 3:5-dimethyl-aniline; 4-methoxy-1-naphthylamine; 4-methyl-1-naphthylamine; 4-methyl-2-naphthylamine; 4-ethoxy-aniline; 4-methyl-5-chlor-aniline; 4-chlor - 6 - methoxy-aniline; 4-methyl-aniline; 4-brom-6-ethoxy-aniline; 4 - methyl 5 - brom-aniline; 4-phenyl-aniline; 4-phenoxy-aniline; 4-methoxy-aniline; 4-chlor-7-naphthylamine; 4-benzyloxy-aniline; 5-methoxy-1-naphthylamine; 5-chlor-1-naphthylamine; 5-chlor-7-naphthylamine; 5-chlor-6-methyl-aniline; 5-chlor - 6 - methoxy-aniline; 7-chlor-1-naphthylamine; 4-chlor-aniline; alpha-naphthylamine; beta-naphthylamine. Although a large number of coupling components have been recited herein, it is to be understood that they are not exclusive of others, and that the other components falling within the broad claims may also be used.

In the form of the invention which involves the dyeing of a cloth by the so-called process of printing, the azo component, diazotized and stabilized as hereinabove described, is mixed in a basic paste with the second component, and the paste is applied to an etched or "printing" roller which impregnates the fabric by contact. The fabric may then be placed in a closed container to be subjected for a few seconds at elevated temperature to the action of the fumes of an acid, usually in the presence of water vapor. The acid used may conveniently be acetic acid. The acid neutralizes the basicity of the paste, the complex with the stabilizing agent, such as the piperidine-alpha-carboxylic acid complex is broken up, the first component is freed, and couples with the coupling component. It is our surprising discovery that by this method azo colors which could not be used for dyeing because neither the azo component, the coupling component, nor the dye itself were substantive can be used to color fibres and other dyeable materials and produce a superior dyeing. These dyes may advantageously include as substituents in the aryl nuclei, an n-auxochrome. The n-auxochromes are, specifically, the groups alkyl, alkoxy, halogen, aryloxy, aralkyl, aralkoxy, aryl, hydroaryloxy, and trifluoro-alkyl. Generally speaking, entirely satisfactory results can be obtained by the substitution in the aryl nucleus of the first component of from one to three of these substituents. However, four and five substituents can be satisfactorily substituted in this component. The n-auxochromes are also satisfactory substituents in the aryl nucleus of the coupling component. However, coupling components having no n-auxochrome substituents generally may be made to produce excellent colors; and, consequently, the number of n-auxochrome substituents in the coupling component, even in the preferred form of the invention, varies from zero to the limit of its capacity. However, the addition of large numbers of substituents to the aryl nucleus of the coupling component, while possessing no disadvantages, does not appear to have distinct advantage over similar compounds containing a fewer number of substituents.

The following examples are illustrative of the invention:

*Example 1*

A printing paste was prepared according to the formula:

3.4 parts of the diazoimino compound obtained by the action of diazotized 3-chlor-6-methoxy-aniline on piperidine-alpha-carboxylic-acid in an alkaline solution.
2.6 parts of aceto-acetyl-4-ethoxy-anilide
6.0 parts of cellosolve
2.0 parts of 26% sodium hydroxide solution
50.0 parts of starch-gum tragacanth thickener, prepared according to the following formula:
    80 parts of wheat starch
    360 parts of a 5% solution of gum tragacanth
    560 parts of water
36.0 parts of water at 140° F.
_____
100.0 parts total.

Cotton goods were printed from an engraved copper roll with the above paste, dried and then exposed for 1¼ minutes to the vapors of a boiling 5% solution of acetic acid. The printed cotton was then rinsed with water, soaped 1 minute at 160° F. in ½% soap solution, rinsed again and dried. The treated fiber was colored bright yellow by a dye of the probable formula:

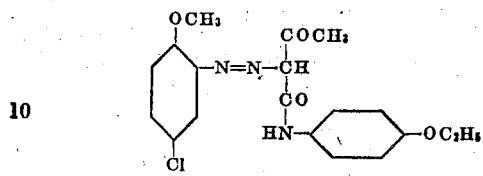

The dye had excellent fastness to light, chlorine, and laundering.

Example 2

A printing paste was prepared according to the following formula:

3.5 parts of the diazoimino compound obtained by the reaction between diazotized 3-chlor-6-methoxy-aniline and piperidine-alpha-carboxylic-acid.
2.5 parts of aceto-acetyl-3-chlor-4-methyl-anilide
6.0 parts of cellosolve
2.0 parts of a 26% solution of sodium hydroxide
50.0 parts of starch-gum tragacanth thickener
36.0 parts of water at 140° F.
_____
100.0 parts Cotton goods were printed with the above paste from an engraved copper roll and dried. The cloth was then exposed for 1¼ minutes to a 5% acetic acid ager, rinsed, soaped for 1 minute to remove the carboxylic acid at 160° F. in ½% soap solution, and dried. The printed portions of the goods were dyed a bright greenish yellow by the developed dyestuff of the probable formula:

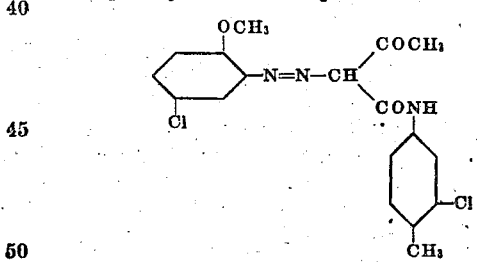

The dyeings showed excellent fastness to light, chlorine, and laundering.

Example 3

A printing paste was prepared according to the following formula:

3.5 parts of the diazoimino compound obtained by the reaction of diazotized 3-chlor-6-methoxy-aniline with piperidine-alpha-carboxylic acid.
2.5 parts of aceto-acetyl-1-naphthylamide
6.0 parts of cellosolve
2.0 parts of a 26% solution of sodium hydroxide
50.0 parts of starch-gum tragacanth thickener
36.0 parts of water at 140° F.
_____
100.0 parts Cotton goods were printed from an engraved copper roll with the above paste, and then dried. The printed cotton was exposed for 1¼ minutes to the vapors of a boiling 5% solution of acetic acid; it was next rinsed, soaped 1 minute at 160° F. in ½% soap solution, rinsed and dried. The treated fiber was colored a reddish yellow by a dyestuff of the probable formula:

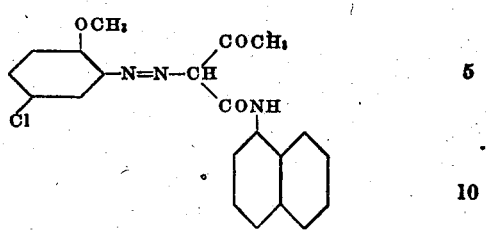

The dyeings possessed a satisfactory degree of resistance to the action of light, chlorine, and laundering.

Example 4

A printing paste was prepared according to the following formula:

3.5 parts of the diazoimino compound obtained by the reaction of diazotized 5-chlor-2-methyl-aniline with piperidine-alpha-carboxylic-acid
2.5 parts of aceto-acetyl-alpha-naphthylamide
6.0 parts of cellosolve
2.0 parts of a 26% solution of sodium hydroxide
50.0 parts of starch-gum tragacanth thickener
36.0 parts of water at 140° F.
_____
100.0 parts Cotton goods were printed with the above paste from an engraved copper roll, and then dried. The cloth was next aged for 1¼ minutes in a 5% acetic acid ager, rinsed, soaped for one minute at 160° F. in ½% soap solution, rinsed again and dried. The treated portions of the cloth were colored a reddish yellow by the dyestuff of the probable formula:

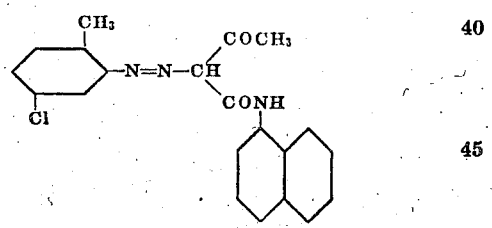

The dyeings showed a satisfactory degree of resistance to light, chlorine, and laundering.

Example 5

A printing paste was prepared according to the formula:

3.5 parts of the diazoimino compound prepared by the reaction of diazotized 5-chlor-6-methyl-aniline with piperidine-alpha-carboxylic-acid
2.5 parts of aceto-acetyl-alpha-naphthyl-amide
6.0 parts of cellosolve
2.0 parts of a 26% solution of sodium hydroxide
50.0 parts of starch-gum-tragacanth thickener
36.0 parts of water at 140° F.
_____
100.0 parts Cotton goods were printed with the above paste from an engraved copper roll, and dried. The cloth was then aged for 1¼ minutes in a 5% acetic acid ager, rinsed, soaped for one minute at 160° F. in ½% soap solution, rinsed again and dried. The printed portions of the goods were dyed a reddish yellow by a dyestuff of the probable formula:

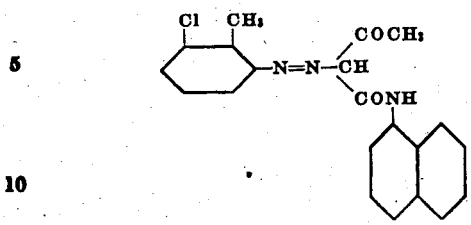

The dyeings possessed a fair degree of fastness to light, chlorine, and laundering.

Example 6

A printing paste was prepared according to the following formula:

- 3.5 parts of the diazoimino compound derived from the reaction of diazotized 3-chlor-6-methoxy aniline with piperidine-alpha-carboxylic-acid
- 2.5 parts of aceto-acetyl-beta-naphthylamide
- 6.0 parts of cellosolve
- 2.0 parts of a 26% solution of sodium hydroxide
- 50.0 parts of starch-gum-tragacanth thickener
- 36.0 parts of water at 140° F.

100.0 parts

Cotton goods were printed from an engraved copper roll with this paste, and dried. They were then exposed for one minute to a 5% acetic acid ager, rinsed, soaped at the boil for one minute with a 1% soap solution, rinsed and dried. The printed portions of the goods were colored a yellow by the dyestuff of the probable formula:

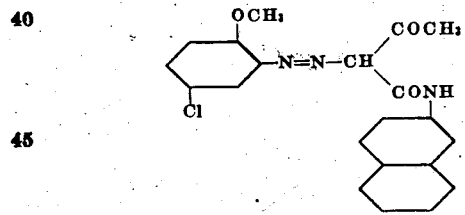

The dyeings showed excellent fastness to laundering and to the action of light and chlorine.

Example 7

A printing paste was prepared according to the following formula:

- 3.3 parts of the diazoimino compound derived from the reaction of diazotized 3-chlor-6-methoxy-aniline with piperidine-alpha-carboxylic-acid
- 2.7 parts of aceto-acetyl-7-methoxy-1-naphthylamide
- 6.0 parts of cellosolve
- 2.0 parts of a 26% solution of sodium hydroxide
- 50.0 parts of starch-gum-tragacanth thickener
- 36.0 parts of water at 140° F.

100.0 parts

Cotton goods were printed from an engraved copper roll with this paste, and were dried. The goods were then exposed to a 5% acetic acid ager at the boil, rinsed, soaped at the boil for one minute with a 1% soap solution, and rinsed again. The printed portions of the goods were colored a reddish yellow by the dyestuff of the probable formula:

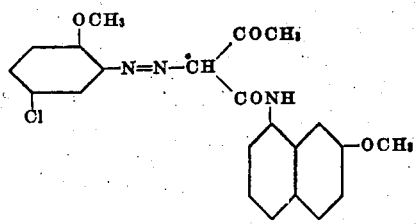

The dye has an excellent resistance to laundering, and to the action of light and chlorine.

Example 8

The substitution of 3.2 parts of the diazoimino compound prepared by the reaction of diazotized 5-chlor-2-methyl-aniline and piperidine-alpha-carboxylic-acid and 2.8 parts of aceto-acetyl-7-methoxy-1-naphthylamide for the color components given in Example 7 gives a printing paste which, when printed and developed in the usual manner gives reddish yellow dyeings of satisfactory resistance to light, chlorine, and laundering. The probable constitution of the dyestuff may be represented by the formula:

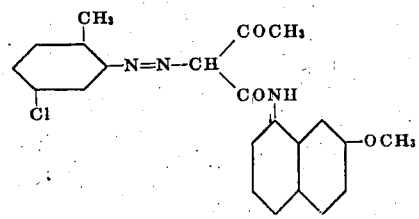

Example 9

The substitution of 3.2 parts of the diazoimino compound prepared by the reaction of diazotized 5-chlor-6-methyl-aniline with piperidine-alpha-carboxylic-acid and 2.8 parts of aceto-acetyl-7-methoxy-1-naphthylamide gives a printing paste which dyes cotton or regenerated cellulose a reddish yellow. The dyestuff shows a satisfactory degree of resistance to the action of light, chlorine, and laundering. The probable composition of the dyestuff is represented by the formula:

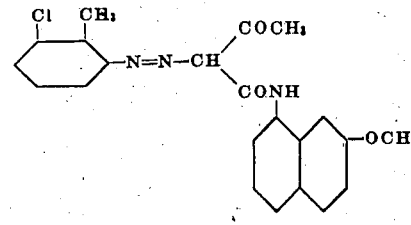

Example 10

A printing paste was prepared according to the formula:

- 3.5 parts of the diazoimino compound derived from the reaction between diazotized 3-chlor-6-methoxy-aniline and piperidine-alpha-carboxylic acid
- 2.5 parts of aceto-acetyl-2-methoxy-1-naphthylamide
- 6.0 parts of cellosolve
- 2.0 parts of a 26% solution of sodium hydroxide
- 50.0 parts of starch-gum-tragacanth thickener
- 36.0 parts of water at 140° F.

100.0 parts

Cotton goods printed with this paste and developed in the usual manner were dyed a weak yellow by developed dyestuff of the probable formula:

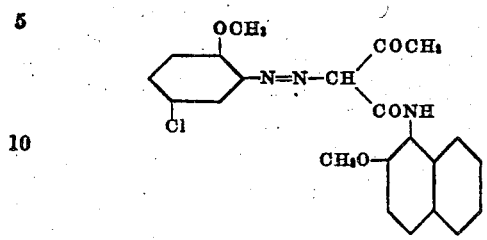

The dyeings were altered by the action of chlorine, and are probably of no commercial value.

Example 11

A printing paste was prepared according to the following formula:

3.6 parts of the diazoimino compound formed by the reaction of diazotized 4-chlor-6-ethoxy-aniline with piperidine-alpha-carboxylic acid in an alkaline solution
2.4 parts of aceto-acetyl-4-ethoxy-anilide
6.0 parts of cellosolve
2.0 parts of 26% sodium hydroxide solution
50.0 parts of starch-gum-tragacanth thickener
36.0 parts of water at 140° F.

100.0 parts

Cotton goods were printed from an engraved copper roll with the above paste, dried, and then aged for 1¼ minutes in a 5% acetic acid ager, rinsed with water, soaped for 1 minute at 160° F. in ½% soap solution, rinsed and dried. The printed portions of the cotton goods were dyed a bright yellow by the dye of the probable formula:

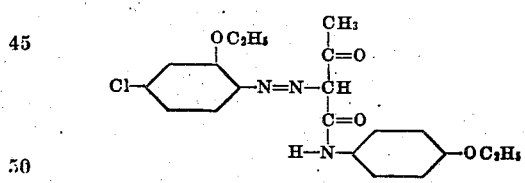

The dye possessed good fastness to light, chlorine, and Nafal laundry test.

Example 12

A printing paste was prepared according to the following formula:

3.6 parts of the diazoimino compound of 4-chlor-6-ethoxy-aniline formed by reaction of the diazotized amine with piperidine-alpha-carboxylic-acid
2.4 parts of aceto-acetyl-3-chlor-6-methyl-aniline
6.0 parts cellosolve
2.0 parts of 26% sodium hydroxide solution
50.0 parts of starch-gum-tragacanth thickener
36.0 parts of water at 140° F.

100.0 parts

Cotton goods were printed, aged and soaped according to procedure given in previous examples. The resulting prints were bright greenish-yellow and showed good fastness to light, chlorine, and Nafal laundry test. The dye had the formula:

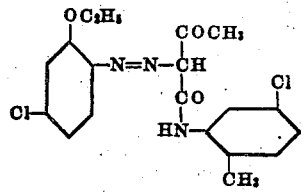

Example 13

A printing paste was prepared according to the following formula:

3.5 parts of diazoimino compound formed by the reaction of diazotized 4-chlor-6-methoxy-aniline with piperidine-alpha-carboxylic-acid
2.5 parts of aceto-acetyl-4-ethoxy-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed, aged, and soaped according to procedure given in previous examples. The resulting prints were bright yellow and showed good fastness to light, chlorine, and Nafal laundry test. The dye had the formula:

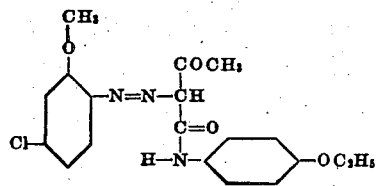

Example 14

A printing paste was prepared according to the following formula:

3.6 parts of the diazoimino compound formed by the reaction of diazotized 3-chlor-6-ethoxy-aniline with piperidine-alpha-carboxylic-acid in an alkaline solution
2.4 parts of aceto-acetyl-4-ethoxy-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed, aged, and soaped according to procedure given in previous examples. The resulting prints were bright yellow and showed very good fastness to light, chlorine, and Nafal laundry test. The probable formula for the dye was:

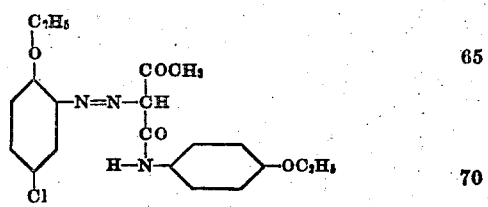

Example 15

A printing paste was prepared according to the following formula:

3.7 parts of the diazoimino compound formed by the reaction between diazotized 3-brom-6-methoxy-aniline and piperidine-alpha-carboxylic-acid in an alkaline solution
2.3 parts of aceto-acetyl-4-ethoxy-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed, aged, and soaped according to procedure given in previous examples. The resulting prints were bright yellow and showed very good fastness to light, chlorine, and Nafal laundry test. The probable formula for the dye was:

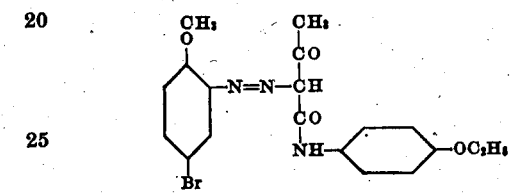

*Example 16*

A printing paste was prepared according to the following formula:
3.4 parts of the diazoimino compound formed by the reaction between diazotized ortho-methoxy-aniline and piperidine-alpha-carboxylic-acid in an alkaline solution
2.6 parts of aceto-acetyl-3-chlor-6-methyl-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed, aged, and soaped according to procedure given in previous examples. The resulting prints were bright greenish-yellow, and showed very good fastness to light, chlorine, and Nafal laundry test. The probable formula for the dye was:

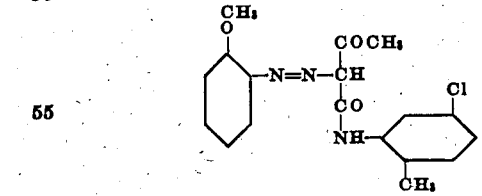

*Example 17*

A printing paste was prepared according to the following formula:
3.3 parts of diazoimino compound (formula same as in Example 16) made from diazotized ortho-methoxy-aniline and piperidine-alpha-carboxylic acid
2.7 parts of aceto-acetyl-3-chlor-6-methoxy-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed, aged, and soaped according to procedure given in previous examples. The resulting prints were bright-greenish-yellow and showed good fastness to light, chlorine, and Nafal laundry test. The probable formula for the dye was:

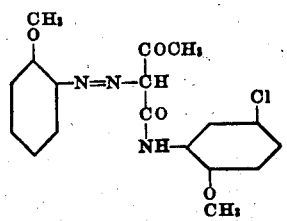

*Example 18*

A printing paste was made according to the following formula:
3.4 parts of the diazoimino compound formed by the reaction of diazotized ortho-ethoxy-aniline with piperidine-alpha-carboxylic-acid in an alkaline solution
2.6 parts of aceto-acetyl-3-chlor-6-methoxy-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed, aged, and soaped according to the procedure given in previous examples. The resulting prints were dull yellow and only showed fair fastness to chlorine, light, and Nafal laundry test. The probable formula for the dye was:

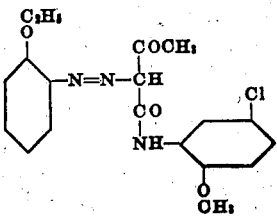

*Example 19*

A printing paste was prepared according to the following formula:
3.6 parts of the diazoimino compound formed by the reaction between diazotized 3-chlor-6-methoxy-aniline and piperidine-alpha-carboxylic-acid
2.4 parts of aceto-acetyl-m-methoxy-aniline
6.0 parts of cellosolve
2.0 parts of a 26% solution of sodium hydroxide
50.0 parts of starch-gum-tragacanth thickener
36.0 parts of water at 140° F.

100.0 parts

Cotton goods were printed with this paste from an engraved copper roller, and then dried. The goods were next aged for 1¼ minutes in a 5% acetic acid ager, rinsed, soaped for one minute at 160° F. in ½% soap solution, rinsed, and dried. The printed portions of the goods were dyed a bright yellow by a dyestuff of the probable formula:

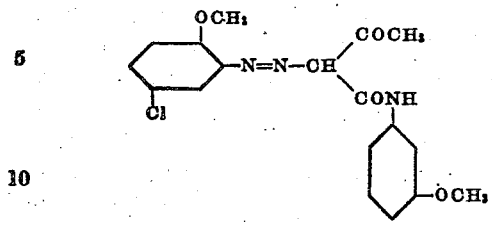

The dyeings possessed a good degree of stability to light, chlorine and laundering.

*Example 20*

A printing paste was prepared according to the following formula:

3.5 parts of the diazoimino compound derived from the reaction of diazotized 3-chlor-6-methoxy-aniline with piperidine-alpha-carboxylic-acid
2.5 parts of aceto-acetyl-m-ethoxy-aniline
6.0 parts of cellosolve
2.0 parts of a 26% solution of sodium hydroxide
50.0 parts of starch-gum-tragacanth thickener
36.0 parts of water at 140° F.

100.0 parts

Cotton goods were printed with the above paste, and then dried. The goods were then exposed for 1¼ minutes to the vapors of a boiling 5% solution of acetic acid, rinsed, soaped for 1 minute at 160° F. in ½% soap solution, rinsed, and dried. The printed portions of the goods were dyed a bright greenish yellow by the dyestuff of the probable formula:

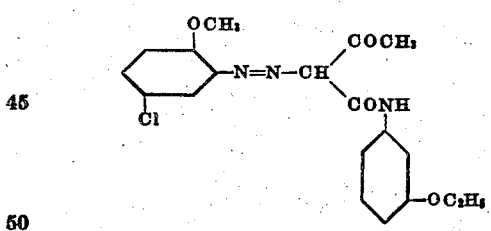

The dyeings possessed a very satisfactory degree of fastness to light, chlorine, and laundering.

*Example 21*

A printing paste was prepared according to the following formula:

3.8 parts of the diazoimino compound obtained by the action of diazotized 3-chlor-6-methoxy-aniline on piperidine-alpha-carboxylic-acid
2.2 parts of aceto-acetyl-o-methyl-aniline
6.0 parts of cellosolve
2.0 parts of 26% sodium hydroxide solution
50.0 parts of starch-gum-tragacanth thickener
36.0 parts of water at 140° F.

100.0 parts

Cotton goods were printed from an engraved copper roll with the above paste, and then dried. The printed cotton was exposed for 1¼ minutes to the vapors of a boiling 5% solution of acetic acid; it was then rinsed, soaped 1 minute at 160° F. in ½% soap solution, rinsed, and dried. The treated fiber was colored a greenish-yellow by a dyestuff of the probable formula:

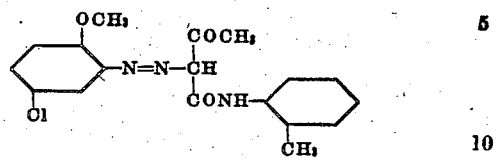

The dye possessed a fair degree of fastness to light, chlorine, and Nafal laundry test.

*Example 22*

A printing paste was prepared according to the following formula:

3.5 parts of the diazoimino compound formed by the reaction of diazotized 3-chlor-6-methoxy-aniline with piperidine-alpha-carboxylic-acid
2.5 parts of aceto-acetyl-2:5-dimethoxy-anilide
6.0 parts of cellosolve
2.0 parts of a 26% solution of sodium hydroxide
50.0 parts of starch-gum-tragacanth thickener
36.0 parts of water at 140° F.

100.0 parts

Cotton goods were printed from an engraved copper roll with the above paste, and then dried. The goods were then aged for 1¼ minutes in a 5% acetic acid ager, rinsed, soaped for 1 minute at 160° F. in ½% soap solution, rinsed, and dried. The printed portions of the goods were dyed a bright yellow by the dyestuff of the probable formula:

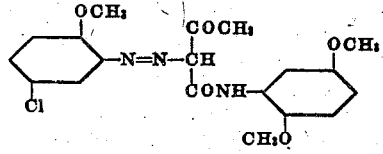

The dyestuff possessed a very good fastness to light and fairly good fastness to chlorine and laundering.

*Example 23*

A printing paste was prepared according to the following formula:

3.2 parts of the diazoimino compound prepared by the reaction of diazotized 3-chlor-6-methoxy-aniline with piperidine-alpha-carboxylic-acid
2.8 parts of aceto-acetyl-4-chlor-2:5-dimethoxy-anilide
6.0 parts of cellosolve
2.0 parts of 26% sodium hydroxide solution
50.0 parts of starch-gum-tragacanth thickener
36.0 parts of water at 140° F.

100.0 parts

Cotton goods were printed from an engraved copper roller with the above paste, and then dried. The goods were then aged for 1¼ minutes in a 5% acetic acid ager, rinsed, soaped for one minute at 160° F. in ½% soap solution, rinsed and dried. The printed portions of the goods were tinted a brilliant reddish yellow, the dyestuff having the probable formula:

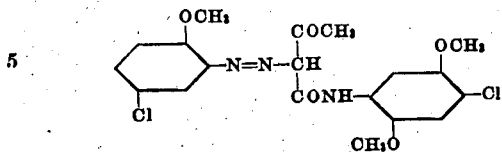

These dyeings possessed excellent strength, shade, and fastness to light, chlorine, and Nafal laundry test.

Example 24

A printing paste was prepared according to the following formula:

3.1 parts of the diazoimino compound prepared by the action of diazotized 3-chlor-6-methoxy-aniline upon piperidine-alpha-carboxylic-acid.
2.9 parts of aceto-acetyl-4-chlor-2:5-diethoxy-aniline
6.0 parts of cellosolve
2.0 parts of a 26% solution of sodium hydroxide
50.0 parts of starch-gum-tragacanth thickener
36.0 parts of water at 140° F.

100.0 parts

Cotton goods were printed from an engraved copper roller with the above paste, and were then dried. The goods were then exposed for 1¼ minutes to a 5% acetic acid ager, rinsed, soaped for ½ minute at 160° F. in ½% soap solution, rinsed, and dried. The treated portions of the goods were tinted a bright greenish yellow by the dyestuff of the probable formula:

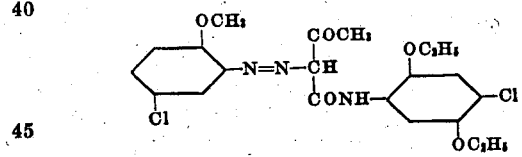

The dyeings were very satisfactory in strength, shade, and fastness to light, chlorine, and the Nafal laundry test.

Example 25

A printing paste was prepared according to the following formula:

3.3 parts of the diazoimino compound formed by the action of diazotized 3-chlor-6-methoxy-aniline and piperidine-alpha-carboxylic-acid
2.7 parts of aceto-acetyl-2-methoxy-4-chlor-5-methyl-anilide
6.0 parts of cellosolve
2.0 parts of 26% sodium hydroxide solution
50.0 parts of starch-gum-tragacanth thickener
36.0 parts of water at 140° F.

100.0 parts

Cotton goods were printed from an engraved copper roller with the above paste, and then dried. The goods were aged 1¼ minutes in a 5% acetic acid ager, rinsed, soaped one minute at 160° F. in ½% soap solution, rinsed, and dried. The printed portions of the goods were dyed a bright reddish-yellow, excellent in shade, strength, and fastness to light, chlorine, and the Nafal laundry test. The probable structure of the dyestuff may be expressed as follows:

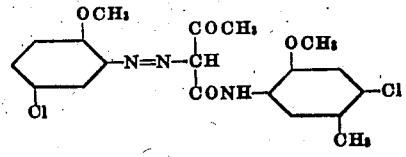

Example 26

A printing paste was prepared according to the following formula:

3.3 parts of the diazoimino compound obtained by the reaction of diazotized 3-chlor-6-methoxy-aniline with piperidine-alpha-carboxylic-acid
2.7 parts of aceto-acetyl-2-ethoxy-4-chloranilide
6.0 parts of cellosolve
2.0 parts of a 26% solution of sodium hydroxide
50.0 parts of starch-gum-tragacanth thickener
36.0 parts of water at 140° F.

100.0 parts

Cotton goods were printed with this paste from an engraved copper roll, and dried. The goods were then developed for 1¼ minutes in a 5% acetic acid ager, rinsed, soaped for 1 minute at 160° F. in ½% soap solution, rinsed, and dried. The printed portions of the cotton were dyed a bright greenish yellow by a dyestuff of the probable formula:

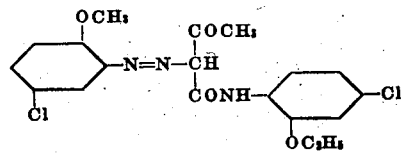

The dyeings were excellent in respect to strength, shade, and fastness to light, chlorine, and the Nafal laundry test.

Example 27

A printing paste was prepared according to the following formula:

3.2 parts of the diazoimino compound obtained by the action of diazotized 3-chlor-6-methoxy-aniline upon piperidine-alpha-carboxylic-acid
2.8 parts of aceto-acetyl-2-methoxy-5-brom-anilide
6.0 parts of cellosolve
2.0 parts of 26% sodium hydroxide solution
50.0 parts of starch-gum-tragacanth thickener
36.0 parts of water at 140° F.

100.0 parts

Cotton goods were printed with this paste from an engraved copper roller, and were then dried. The goods were exposed to a 5% acetic acid ager for 1¼ minutes, rinsed, soaped at 160° F. for 1 minute in ½% soap solution, rinsed, and dried. The printed portions of the cotton were dyed a bright yellow by the dyestuff of the probable formula:

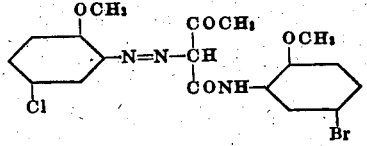

The dyestuff possessed satisfactory strength, shade, and fastness to light, chlorine, and the Nafal laundry test.

*Example 28*

A printing paste was prepared according to the following formula:

- 3.4 parts of the diazoimino compound obtained by the reaction of diazotized 3-chlor-6-methoxy-aniline with piperidine-alpha-carboxylic-acid
- 2.6 parts of aceto-acetyl-2:5-dichloraniline
- 6.0 parts of cellosolve
- 2.0 parts of a 26% solution of sodium hydroxide
- 50.0 parts of starch-gum-tragacanth thickener
- 36.0 parts of water at 140° F.

100.0 parts

Cotton goods were printed with the above paste from an engraved copper roll, and then dried. The printed cotton was exposed for 1¼ minutes to the vapors of a boiling 5% solution of acetic acid; it was next rinsed, soaped for 1 minute at 160° F. in soap solution, rinsed, and dried. The treated fibre was colored a reddish yellow by a dyestuff of the probable formula:

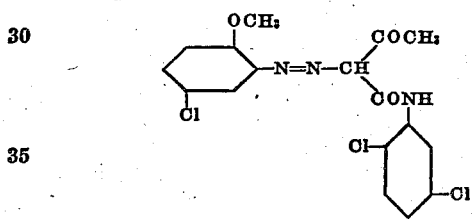

The dyeings possessed a satisfactory degree of resistance to light, chlorine, and laundering tests.

*Example 29*

A printing paste was prepared according to the following formula:

- 3.6 parts of the diazoimino compound obtained by the reaction of diazotized 3-chlor-6-methoxy-aniline with piperidine-alpha-carboxylic-acid
- 2.4 parts of aceto-acetyl-2-chlor-aniline
- 6.0 parts of cellosolve
- 2.0 parts of a 26% solution of sodium hydroxide
- 50.0 parts of starch-gum-tragacanth thickener
- 36.0 parts of water at 140° F.

100.0 parts

The paste was printed upon cotton goods and was developed in an acid atmosphere. The cloth was dyed a greenish yellow which showed good resistance to the action of light, chlorine, and laundering. Its probable composition may be represented by the formula:

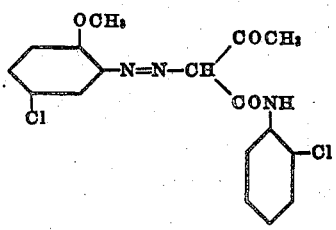

*Example 30*

The color components given in Example 28 were replaced by the following components: 3.2 parts of the pipecolinic acid derivative of diazotized 3-chlor-6-methoxy-aniline; 2.8 parts of aceto-acetyl-2-methoxy-5-bromaniline. The printing paste was prepared, applied to cotton goods and developed in the manner previously described. The resulting prints were greenish yellow in color, and of excellent fastness to light, chlorine, and laundering.

The foregoing examples have been given to indicate the wide application and possibilities of the invention. Many of the examples are directed to printing pastes because they offer an excellent manner of applying the dyestuff. The dyestuff can be made, however, by following the general principle hereinbefore explained, but without making a printing paste, by impregnating the fabric with the two constituents in a basic medium and causing them to react by the application of an acid medium.

In addition to the compounds disclosed in the foregoing examples we have made the dyestuffs set forth in the following table and have dyed materials with them. The first column of the table shows the azo component of the dye; the second shows the coupling component; the third shows the color of the dye formed by the combination of the components of the first two columns; the fourth shows the fastness of the dye to light; the fifth column shows the fastness of the dye to laundering (Nafal label test); and the sixth column shows the fastness of the dye to the chlorine test. Each of these tests is standard and the nature thereof will be understood by persons skilled in the art.

| Azo component | Coupling component | Color | Light fastness | Laundering | Chlorine |
|---|---|---|---|---|---|
| | Aceto-acetyl derivative of: | | | | |
| 5-chlor-6-methyl-aniline | 3-chlor-4-methoxy-aniline | Greenish-yellow | Excellent | Excellent | Good. |
| 3-chlor-6-methoxy-aniline | do | Reddish-yellow | do | do | Do. |
| Do | 2-chlor-4-ethoxy-aniline | Greenish-yellow | Good | Good | Do. |
| Do | 3-chlor-6-methyl-aniline | do | do | do | Fair. |
| Do | 4-chlor-aniline | do | Fair | do | Do. |
| Do | 5-chlor-6-methyl-aniline | do | do | Fair | Poor. |
| 4-chlor-6-ethoxy-aniline | 3-chlor-6-methoxy-aniline | Yellow | Excellent | Good | Good. |
| 4-chlor-6-methoxy-aniline | do | do | do | do | Do. |
| Do | 3-chlor-6-methyl-aniline | do | Fair | do | Do. |
| 3-chlor-6-ethoxy-aniline | 3-chlor-6-methoxy-aniline | Greenish-yellow | Good | do | Do. |
| 3-brom-6-methoxy-aniline | do | Yellow | Excellent | do | Excellent. |
| 2-methoxy-aniline | 4-ethoxy-aniline | Greenish-yellow | do | do | Good. |
| 3-chlor-6-methyl-aniline | 2:5-diethoxy-4-chlor-aniline | Yellow | Good | do | Do. |
| 5-chlor-6-methyl-aniline | do | do | do | do | Fair. |
| 3-chlor-6-methoxy-aniline | 3-methyl-aniline | Greenish-yellow | Fair | Fair | Poor. |
| Do | 2-methyl-5-brom-aniline | do | Excellent | Excellent | Excellent. |
| Do | 4-methyl-5-brom-aniline | Bright greenish-yellow | Fair | do | Good. |
| Do | 2-methyl-4-chlor-aniline | do | Excellent | do | Fair. |
| 2:5-dimethyl-4-chlor-aniline | 2-methyl-5-chlor-aniline | Greenish-yellow | Good | Good | Excellent. |
| 3-brom-6-methoxy-aniline | do | do | Fair | do | Do. |

| Azo component | Coupling component | Color | Light fastness | Laundering | Chlorine |
|---|---|---|---|---|---|
| | Aceto-acetyl derivative of: | | | | |
| 2:5-dimethoxy-4-chlor-aniline | 2-methyl-5-chlor-aniline | Reddish-yellow | Good | Good | Good. |
| 4-chlor-6-ethoxy-aniline | do | Greenish-yellow | do | do | Fair. |
| 4-brom-5-methyl-aniline | do | do | Fair | do | Good. |
| 3-chlor-6-methoxy-aniline | 2-methoxy-aniline | do | do | Fair | Fair. |
| Do | 4-methoxy-aniline | Reddish-yellow | Good | Good | Good. |
| 2-methyl-3-chlor-aniline | do | Greenish-yellow | do | do | Do. |
| 3-chlor-6-methoxy-aniline | 2-methoxy-4-brom-aniline | do | do | do | Do. |
| 3-chlor-6-methyl-aniline | do | Yellowish-green | do | do | Do. |
| 3-chlor-6-methoxy-aniline | 2-methoxy-4-chlor-aniline | Greenish-yellow | Excellent | Excellent | Excellent. |
| Do | 2-methoxy-5-chlor-aniline | Bright yellow | do | do | Do. |
| 3-brom-4-methyl-aniline | do | Greenish-yellow | Good | Good | Good. |
| 2:5-dimethyl-4-chlor-aniline | do | Reddish-yellow | do | do | Do. |
| 2-methoxy-aniline | 2:5-dimethoxy-4-chlor-aniline | | Excellent | do | Do. |
| 5-methoxy-aniline | do | Greenish-yellow | Fair | do | Fair. |
| 2:5-dimethoxy-4-chlor-aniline | do | do | Good | do | Good. |
| 4-chlor-6-ethoxy-aniline | do | Reddish-yellow | Fair | do | Do. |
| 4-chlor-6-methoxy-aniline | do | Yellow | Good | do | Do. |
| 4-methoxy-5-chlor-aniline | do | Greenish-yellow | Fair | Fair | Do. |
| 4-ethoxy-6-chlor-aniline | do | do | do | Excellent | Excellent. |
| 4-chlor-6-methyl-aniline | do | do | do | do | Good. |
| 2-methoxy-5-methyl-aniline | do | do | do | Good | Do. |
| 3-chlor-6-methoxy-aniline | 3-methoxy-4-chlor-aniline | Reddish-yellow | Good | Fair | Do. |
| Do | 6-chlor-4-methoxy-aniline | Greenish-yellow | Excellent | Excellent | Excellent. |
| 3-chlor-6-methyl-aniline | 3-chlor-4-methoxy-aniline | Bright greenish-yellow | Good | Good | Good. |
| 3-chlor-6-methoxy-aniline | 2:5-dimethyl-aniline | do | do | do | Do. |
| Do | 2-methoxy-5-methyl-aniline | Greenish-yellow | Fair | Fair | Fair. |
| 5-chlor-6-methyl-aniline | do | do | Good | Good | Good. |
| 3-chlor-6-methoxy-aniline | 3-ethoxy-aniline | Bright-greenish-yellow | Excellent | Excellent | Excellent. |
| 4-brom-5-methyl-aniline | 4-ethoxy-aniline | Greenish-yellow | Fair | Good | Fair. |
| 4-methyl-aniline | do | do | Good | do | Good. |
| 5-chlor-6-methyl-aniline | do | do | do | Excellent | Fair. |
| 3-chlor-6-methyl-aniline | do | do | Fair | Fair | Good. |
| 3:6-dimethyl-4-chlor-aniline | do | Yellow | Excellent | Excellent | Excellent. |
| 4-methoxy-aniline | do | Greenish-yellow | do | do | Good. |
| 2:5-dimethoxy-4-chlor-aniline | do | Reddish-yellow | Good | Good | Fair. |
| 4-methoxy-5-chlor-aniline | do | Greenish-yellow | Fair | Fair | Do. |
| 4-ethoxy-6-chlor-aniline | do | do | Excellent | Excellent | Excellent. |
| 3-brom-6-methyl-aniline | do | Yellow | Good | Good | Fair. |
| 4-methyl-5-brom-aniline | do | Reddish-yellow | Fair | do | Good. |
| 4-chlor-6-methyl-aniline | do | do | Good | do | Do. |
| 2-methoxy-5-methyl-aniline | do | Yellow | do | do | Do. |
| 2-methoxy-4-chlor-5-methyl-aniline | do | Reddish-yellow | do | do | Fair. |
| 2:5-diethoxy-4-chlor-aniline | do | do | Fair | Fair | Do. |
| 3-chlor-6-methyl-aniline | 2:5-dimethoxy-aniline | Yellow | Good | Good | Excellent. |
| 5-chlor-6-methyl-aniline | do | do | do | do | Good. |
| 3-chlor-6-methoxy-aniline | 2:5-dimethyl-4-chlor-aniline | Greenish-yellow | Excellent | Excellent | Excellent. |
| 3-chlor-6-methyl-aniline | do | Yellow | Good | Good | Good. |
| 3-chlor-6-methoxy-aniline | 2-chlor-4-ethoxy-aniline | Greenish-yellow | do | do | Do. |
| 3-chlor-6-methoxy-aniline | 2-methoxy-4-chlor-5-methyl-aniline | do | do | do | Do. |
| 5-chlor-6-methyl-aniline | do | do | Fair | do | Do. |
| 3-chlor-6-methyl-aniline | 2:5-dimethoxy-4-chlor-aniline | Reddish-yellow | Excellent | Excellent | Excellent. |
| 5-chlor-6-methyl-aniline | do | do | do | Fair | Good. |
| 3-chlor-6-methoxy-aniline | 2:5-diethoxy-aniline | Greenish-yellow | do | Good | Do. |
| 5-chlor-6-methyl-aniline | do | do | do | Excellent | Excellent. |
| 3-chlor-6-methoxy-aniline | 4-phenoxy-aniline | Reddish-yellow | Fair | Fair | Fair. |
| Do | 4-benzyloxy-aniline | do | Good | Good | Good. |

Among the stabilizing agents useful in stabilizing the azo component we name, as examples but not as a limitation: sarcosine, ethyl-taurine, proline, 4-sulfo-2-amino-benzoic-acid, methyl-glucamine. The use of stabilizers such as these for the preparation of water-soluble diazo amino compounds is well known in the art.

If it is desired to prepare the color apart from a material, the preparation can be carried out by dissolving or suspending the coupling component in an aqueous medium, adding the diazo solution in the presence of an acid binding agent, such as sodium acetate, sodium bicarbonate, and sodium carbonate, or the like. The colors formed are insoluble in water, and are separated by precipitation and filtration.

By this invention there may be produced yellow dyes which are of outstanding fastness, some of which are actually superior to vat dyes, and, of course, are much less costly. These dyes also constitute a great advance over the insoluble, yellow azo dyes known to the prior art, being superior in this, particularly, that while retaining the inexpensive nature of other azo dyes, they attain the desirable qualities of greater permanence.

Another advantage of the invention is the discovery that non-substantive dyestuffs whose azo components and coupling components are also not substantive can be used for dyeing. Another advantage of the invention lies in the pigments which may be formed by reacting the components in solution. It is not impossible that some of these colors may have been made before as pigments, however, to the best of our knowledge, none of these colors has ever before been used as a dye. Consequently, these pigments are claimed only to the extent that they may be new.

These dyestuffs are of major use in connection with cotton and regenerated cellulose, and are of minor application with wool, silk, cellulose esters and ethers, and the like.

As many apparently widely different embodiments of this invention may be made without departing from the spirit and scope thereof, it is to be understood that we do not limit ourselves to the specific embodiments thereof except as defined in the appended claims.

We claim:

1. A textile fabric dyed with the coupling product of a diazotized aniline and a non-substantive aceto-acetyl anilide.

2. A cellulosic fabric dyed with the coupling product of a non-substantive, n-auxochrome-substituted, diazotized aniline and a non-substantive, n-auxochrome-substituted aceto-acetyl anilide.

3. A cellulosic material colored with the coupling product of a non-substantive, diazotized aniline and a non-substantive aceto-acetyl-anilide.

4. A cellulosic material dyed with the coupling product of a non-substantive, n-auxochrome-substituted, diazotized aniline and a non-substantive, n-auxochrome-substituted aceto-acetyl-anilide in which an auxochrome of the diazo component is alkoxy and in which auxochromes of the coupling component are halogen and alkoxy.

5. A cellulosic material dyed with the coupling product of a non-substantive, n-auxochrome-substituted, diazotized aniline and a non-substantive, n-auxochrome-substituted aceto-acetyl-anilide in which an auxochrome of the diazo component is halogen and in which auxochromes of the coupling component are halogen and alkoxy.

6. A cellulosic material dyed with the coupling product of a non-substantive, n-auxochrome-substituted, diazotized aniline and a non-substantive, n-auxochrome-substituted, aceto-acetyl-anilide in which auxochromes of the diazo component are halogen and alkoxy and in which auxochromes of the coupling component are halogen and alkoxy.

7. A cellulosic material dyed with the coupling product of a non-substantive, n-auxochrome-substituted, diazotized aniline and a non-substantive, n-auxochrome-substituted aceto-acetyl-anilide in which auxochromes of the diazo component are halogen and alkoxy and in which the auxochrome of the coupling component is alkoxy.

8. A cellulosic material dyed with the coupling product of a non-substantive, n-auxochrome-substituted, diazotized aniline and a non-substantive, n-auxochrome-substituted aceto-acetyl-anilide in which auxochromes of the diazo component are halogen and alkoxy and in which the auxochrome of the coupling component is halogen.

9. A cellulosic fabric dyed with the coupling product of diazotized 3-chlor-6-methoxy-aniline and a non-substantive, n-auxochrome-substituted aceto-acetyl-anilide.

10. A cellulosic fabric dyed with the coupling product of an n-auxochrome-substituted, diazotized aniline, and aceto-acetyl-4-ethoxy-aniline.

11. A cellulosic fabric dyed with the coupling product of diazotized 3-chlor-6-methoxy-aniline and aceto-acetyl-4-ethoxy-aniline.

12. Fiber dyed with a water-insoluble coupling product of 2-methoxy-4-chloro-5-methyl-1-acetoacetanilide and the diazo-compound of the formula $C_6H_3(NH_2)ClX$, where X is a radical selected from the group consisting of methyl and methoxy.

13. Fiber dyed with a water-insoluble coupling product of 2-methoxy-4-chloro-5-methyl-1-acetoacetanilide and the diazo-compound of 1-amino-2-methyl-5-chlorobenzene.

14. Fiber dyed with a water-insoluble coupling product of 2-methoxy-4-chloro-5-methyl-1-acetoacetanilide and the diazo-compound of 1-amino-2-methoxy-5-chlorobenzene.

15. The method of dyeing which comprises coupling a non-substantive diazotized arylamine to a non-substantive aceto-acetyl-anilide while the said components are in contact with a cellulosic material.

16. The method of dyeing a cellulosic material which comprises impregnating the material with a basic paste containing a non-substantive, diazotized arylamine, having between one and three n-auxochrome substituents, which is stabilized by connection to the nitrogen group of piperidine-alpha-carboxylic acid, and a non-substantive, aceto-acetyl-anilide having not more than three n-auxochrome substituents and being capable of forming with the diazotized arylamine an azo color, subjecting the impregnated material at elevated temperature to the action of a mild acid, and washing and drying the material.

17. The method of dyeing a cellulosic material which comprises impregnating the material with a basic paste containing a non-substantive, water-soluble diazo-amino derivative of an arylamine having one or more n-auxochrome substituents, and a non-substantive aceto-acetyl-anilide having not more than five n-auxochrome substituents, subjecting the impregnated material at elevated temperature to the action of a mild acid, and washing the material.

18. The method of dyeing a cellulosic material which comprises impregnating the material with a basic paste containing a non-substantive, water-soluble diazo-amino derivative of an arylamine having an n-auxochrome substituent, and a non-substantive aceto-acetyl-anilide which may have an n-auxochrome substituent, subjecting the impregnated material at elevated temperature to the action of a mild acid, and removing inactive matter from the material.

19. The method of dyeing a cellulosic material which comprises impregnating the material with a basic paste containing a non-substantive, water-soluble diazo-amino derivative of an arylamine having an n-auxochrome substituent, and a non-substantive aceto-acetyl-anilide which may have an n-auxochrome substituent, and subjecting the impregnated material at elevated temperature to the action of a mild acid.

20. The method of dyeing a cellulosic material which comprises printing the material with a paste containing 3.4 parts of 3-chlor-6-methoxy aniline stabilized by connection to the nitrogen group of piperidine-alpha-carboxylic acid, 2.6 parts of aceto-acetyl-4-ethoxy-aniline, 6.0 parts of the mono-ethyl-ether of diethylene-glycol, 2.0 parts of 26% sodium hydroxide solution, 36 parts of water at 140° F., 50 parts of starch-gum tragacanth thickener containing starch, gum, and water in proportions of 80 parts of wheat starch, 18 parts of gum tragacanth (added as 360 parts of a 5% solution) and 560 parts of water; drying the impregnated material, exposing the material for about one and one-quarter minutes to the vapors of a boiling 5% solution of acetic acid, rinsing with water, soaping, rinsing, and drying.

21. The method of dyeing a cellulosic material which comprises printing the material with a paste containing 3.4 parts of 3-chlor-6-methoxy-aniline stabilized by connection with the nitrogen group of piperidine-alpha-carboxylic acid, 2.6 parts of aceto-acetyl-4-ethoxy-aniline, 2.0 parts of 26% sodium hydroxide solution, a thickener, and a solvent, exposing the impregnated material at elevated temperature to acetic acid vapors, washing, and drying the material.

22. A composition of matter containing 3.4 parts of 3-chlor-6-methoxy-aniline stabilized against reaction in alkaline medium, 2.6 parts of aceto-acetyl-4-ethoxy-aniline, 6.0 parts of the ethyl-ether of diethylene-glycol, 2.0 parts of 26% sodium hydroxide solution, 36 parts of water at 140° F., 50 parts of starch-gum tragacanth thickener containing starch, gum, and water in proportions of 80 parts of wheat starch, 18 parts of gum tragacanth (added as 360 parts of a 5% solution), and 560 parts of water.

23. A composition of matter containing 3.4 parts of stabilized 3-chlor-6-methoxy-aniline, 2.6 parts of aceto-acetyl-4-ethoxy-aniline, 2.0 parts of 26% sodium hydroxide solution, a thickener, and a solvent.

MILES A. DAHLEN.
FRITHJOF ZWILGMEYER.
ROBERT F. DEESE, Jr.
NEWELL M. BIGELOW.